J. M. HOPWOOD.
METHOD AND MEANS FOR CONTROLLING AND REGULATING.
APPLICATION FILED JULY 2, 1920.
1,400,550.
Patented Dec. 20, 1921.
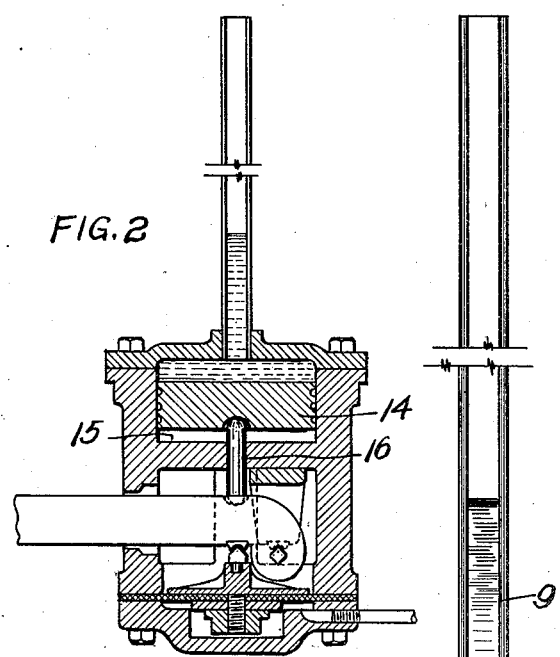
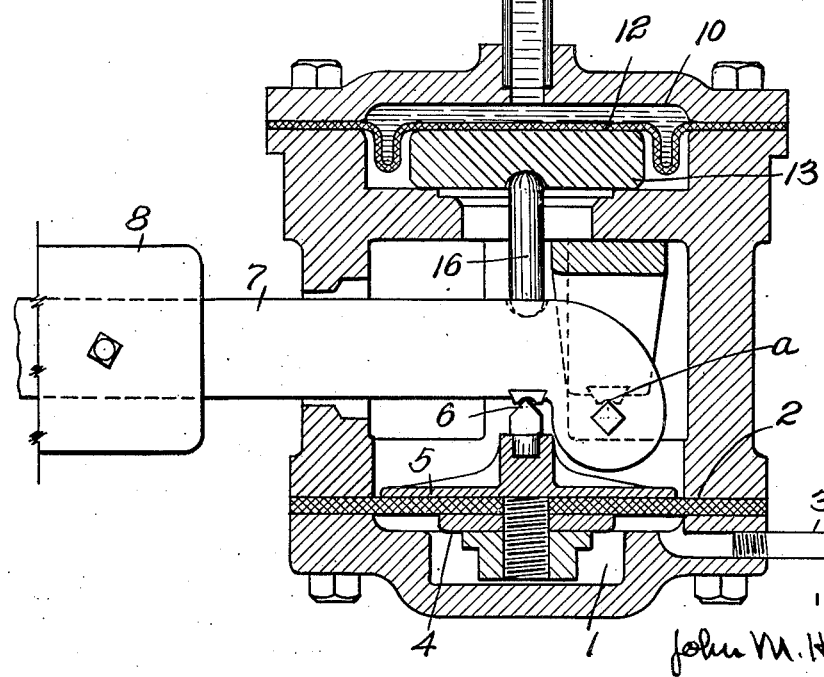
INVENTOR
John M. Hopwood
by Darwin S. Wolcott
Atty

UNITED STATES PATENT OFFICE.

JOHN M. HOPWOOD, OF PITTSBURGH, PENNSYLVANIA.

METHOD AND MEANS FOR CONTROLLING AND REGULATING.

1,400,550. Specification of Letters Patent. Patented Dec. 20, 1921.

Application filed July 2, 1920. Serial No. 393,550.

*To all whom it may concern:*

Be it known that I, JOHN M. HOPWOOD, residing at Pittsburgh, in the county of Allegheny and State of Pennsylvania, a citizen of the United States, have invented or discovered certain new and useful Improvements in Method and Means for Controlling and Regulating, of which improvements the following is specification.

In application Serial Number 381510 filed May 14th, 1920, is shown and described methods of and apparatus for controlling the operation of regulating mechanism by varying the area of action of a constant predetermined pressure on one side of a movable member of the controlling mechanism, the opposite side of such member being subjected to a variable high pressure. Such controlling mechanism is so constructed that in case the movable member is shifted by reason of the increase in the variable high pressure, there will occur an increase in the area of action of the constant pressure in the opposite side of the movable member until equilibrium is established between the forces acting oppositely on the movable member. When the variable high pressure drops the consequent movement of the movable member will cause a progressive decrease in the area of action of the constant pressure on such member until the two forces acting on such member will counterbalance one another.

The invention described herein has for its object the control of a regulating mechanism by neutralizing a portion of a variable high pressure, applying the unneutralized fraction of such high pressure to a movable element forming a part of the controlling device and applying to the opposite side of such member a counterbalancing pressure and varying such counterbalancing pressure by and in accordance with changes in the high pressure. The invention is hereinafter more fully described and claimed.

In the accompanying drawings forming a part of this specification Figure 1 is a sectional elevation of the improved controlling mechanism, and Fig. 2 is a similar view of a modification.

In the practice of the invention the chamber 1 under the diaphragm 2 is connected by a pipe 3 with a vapor generator. Plates 4 and 5 are secured on opposite sides of the diaphragm and the plate 5 bears through a knife edge 6 (preferably formed on one end of a plug removably mounted on the plate) on a lever 7 having its pivotal point at $a$ and provided with an adjustable weight as indicated at 8. By suitably weighting the lever any desired portion of the pressure in the chamber 1 and operating against the diaphragm 2 may be counterbalanced. In order to counterbalance the other portion or fraction of the pressure in the chamber 1 a force automatically variable is also applied to the upper side of the diaphragm 2. In the construction shown this force consists of a column of liquid in pipe 9 connected to a chamber 10, one of whose walls as for example, the bottom, is formed in part at least by a movable member which may consist of a flexible diaphragm 12 and a disk or block 13 as shown in Fig. 1, or a piston 14 arranged in a cylinder 15 as shown in Fig. 2. The pressure exerted by the liquid column is transmitted by a strut 16 to the lever 7 and through the lever and knife edge 6 to the diaphragm 2.

In practice the lever 7 is so weighted as to counterbalance all but a small portion or fraction of the pressure acting on the underside of the diaphragm 2 and the pipe 9 is charged to such a level that the liquid column acting on the movable portion of the walls of the chamber 10 will equal the unneutralized fraction of the pressure in the chamber 1. As for example, if the desired normal working pressure in the generator with which the chamber 1 is connected is two hundred and fifty (250) pounds, the lever 7 will be weighted to exert a counter pressure of two hundred and forty-five (245) pounds more or less on the diaphragm 1, and the chamber 10 and pipe 9 will be charged to such a level that the liquid column contained therein will exert a pressure of five (5) pounds more or less on the movable portion of the chamber 10, such pressure being transmitted as described to the diaphragm 1, thereby equalizing the forces acting oppositely on the diaphragm 1.

In case of an increase of the pressure in the chamber 1, the diaphragm 1 and the parts movable thereby, *i. e.*, the lever 7, the strut and the movable portion of the chamber 10, will be shifted. The movement of the movable portion of the chamber 10 will force liquid from the chamber into pipe 9 increasing the height of the liquid column until the increased pressure of the column counterbalances the increase of pressure in the generator.

As will be readily understood by those skilled in the art, the control effected in the manner herein described, can be employed in connection with any suitable construction of regulating mechanism employed for regulating the operation of motors, operations involved in the combustion of fuel in furnaces and other purposes, it being preferred to employ regulating mechanism of the construction shown and described in Letters Patent No. 1338925, granted May 4th, 1920.

When using such regulating mechanism it is preferred to combine the controlling and regulating mechanism as shown and described in application Serial Number 291779, filed by me April 21, 1919.

While the controlling device is described as being connected to a vapor generator, the pressure by and in accordance with the changes of which the controlling device operates may be otherwise generated, and applied to the lever 7.

I claim herein as my invention:

1. The method of operating a controlling mechanism embodying a movable member which consists in applying a variable pressure to one side of the movable member, applying to the opposite side of the movable member the pressure of a liquid column variable in height and by a movement of the movable member due to a change in the variable pressure, varying the height of the liquid column thereby restoring equilibrium between the pressures acting oppositely on the movable member.

2. The method of operating a controlling mechanism embodying a movable member which consists in neutralizing a predetermined portion of a variable high pressure, applying the unneutralized portion of the pressure to one side of the movable member, applying to the opposite side of the movable member the pressure of a variable liquid column and by a movement of the movable member due to a change in the variation of the high pressure changing the height of the liquid column and thereby restoring equilibrium between the pressures acting oppositely on the movable member.

3. A mechanism having in combination a diaphragm adapted to be subjected on one side to a variable high pressure, means for counterbalancing a portion of such high pressure, a chamber having a portion of its walls movable, a liquid column connected to said chamber and variable in height by the movement of the movable wall and means for applying to the side of the movable wall opposite that acted on by the liquid column a pressure equal to the unneutralized fraction of the high pressure.

In testimony whereof, I have hereunto set my hand.

JOHN M. HOPWOOD.